(12) United States Patent
Chung

(10) Patent No.: US 11,516,971 B2
(45) Date of Patent: Dec. 6, 2022

(54) STACKABLE PLANT POT ASSEMBLY

(71) Applicant: Edmond Chung, Arlington, WA (US)

(72) Inventor: Edmond Chung, Arlington, WA (US)

( * ) Notice: Subject to any disclaimer, the term of this patent is extended or adjusted under 35 U.S.C. 154(b) by 102 days.

(21) Appl. No.: 15/931,448

(22) Filed: May 13, 2020

(65) Prior Publication Data
US 2020/0267909 A1  Aug. 27, 2020

Related U.S. Application Data

(60) Provisional application No. 62/956,286, filed on Jan. 1, 2020.

(51) Int. Cl.
*A01G 9/02*  (2018.01)

(52) U.S. Cl.
CPC .............. *A01G 9/023* (2013.01); *A01G 9/027* (2013.01); *A01G 9/028* (2013.01)

(58) Field of Classification Search
CPC ...... A01G 9/023; A01G 9/027; A01G 9/0295; A01G 9/028; B65D 21/0217; B65D 21/0219; B65D 21/022; B65D 21/0222; B65D 21/0223; B65D 21/023; B65D 21/0235
See application file for complete search history.

(56) References Cited

U.S. PATENT DOCUMENTS

| 3,396,867 | A | * | 8/1968 | Santiago Garriga ....................... B65D 21/0223 206/511 |
| 3,686,791 | A | * | 8/1972 | Mills ...................... E04C 1/395 47/83 |
| 4,057,931 | A | * | 11/1977 | Stutelberg .............. A01G 9/023 47/83 |
| 6,247,192 | B1 | * | 6/2001 | Bostoen .................... E03D 1/14 4/415 |

(Continued)

FOREIGN PATENT DOCUMENTS

| EP | 0024861 A1 * | 3/1981 | ............. A01G 9/023 |
| EP | 0604749 A1 * | 7/1994 | ............. A01G 9/023 |

(Continued)

OTHER PUBLICATIONS

Merriam-Webster, oblong, 2015, https://web.archive.org/web/20150926105459/https://www.merriam-webster.com/dictionary/oblong, retrieved from internet: Apr. 18, 2022 (Year: 2015).*

*Primary Examiner* — Kristen C Hayes
(74) *Attorney, Agent, or Firm* — Barry Choobin; Patent 360

(57) ABSTRACT

A stackable pot assembly having pots arranged in horizontal and vertical directions to form the stacked pot assembly. The assembly includes two or more blocks mounted over each other. The first block mounted over the floor, the first block has one or more rows of twin-bases arranged lengthwise or side-by-side. The upper blocks mounted one over another, (Continued)

and the upper blocks mounted over the first block. The upper block comprises twin-pots and round-pots. The twin-pots and round-pots have feet configured in their bottom, wherein the twin-pot has two spaced-apart feet while the round pot has a single feet. A lid secures the twin-bases, twin-pots, and round-pots, wherein the lid has apertures for receiving the feet when a twin-pot or a round-pot is mounted over the lid secured to below block. The lid is further having a plant hole.

18 Claims, 8 Drawing Sheets

(56) References Cited

U.S. PATENT DOCUMENTS

2012/0180388 A1 * 7/2012 Friedman ............... A01G 9/023
  47/83

FOREIGN PATENT DOCUMENTS

| FR | 2881934 A1 | * | 8/2006 | ............. A01G 9/027 |
| GB | 2230413 A | * | 10/1990 | ............. A01G 9/027 |
| GB | 2400119 A | * | 10/2004 | ............. A01G 9/023 |
| KR | 20120114096 A | * | 10/2012 | |
| WO | WO-2016007005 A1 | * | 1/2016 | ............. A01G 31/02 |

* cited by examiner

STACKABLE PLANT POT ASSEMBLY

CROSS-REFERENCE TO RELATED APPLICATIONS

The present application claims the benefit of U.S. provisional patent application Ser. No. 62/956,286 for "Stackable growing system for hydroponics but can be used with soil", filed Jan. 1, 2020, which is hereby incorporated by reference in its entirety.

FIELD OF INVENTION

The present invention relates to stackable plant pots, and in particular, to stackable plant pots that can be arranged in different configurations.

BACKGROUND

Plant pots, also commonly known as flowerpots or simply pots, are containers used to cultivate plants. Such plants grown in pots, rather than ground, are commonly known as potted plants. The pots are generally used in indoor cultivation of plants and hydroponics. Also, pots are used for cultivating delicate plants and for the transportation of plants.

Many pot plant enthusiasts like to arrange several pots in a generally vertical relationship for particular aesthetic appeal and saving of space. Generally, pots can be mounted to a vertical stand or rack. However, the known method of stacking pots vertically has one or more shortcomings, such as failure to utilize the space efficiently and difficulty in watering the plants. Thus, a need is appreciated for a pot arrangement system that is devoid of the shortcoming of the known systems.

SUMMARY OF THE INVENTION

The shortcomings of the prior art are overcome, and additional advantages are provided through a stackable pot assembly according to the present invention.

It is, therefore, an objective of the present invention that the stackable pot assembly allows stacking the pots in different configurations.

It is another objective of the present invention that the stackable pot assembly allows making horizontal and vertical arrays of the pots.

It is a further objective of the present invention that the stackable pot assembly allows making more efficient use of the available space for plantation.

It is still a further objective of the present invention that the stackable pot assembly can be used for soil-based cultivation of plants.

It is yet a further objective of the present invention that the stackable pot assembly can be used for hydroponics.

It is an additional objective of the present invention that the stackable pot assembly is economical to manufacture.

It is still an additional objective of the present invention that the stackable pot assembly allows watering all the plants evenly.

It is yet an additional objective of the present invention that the stackable pot assembly minimizes wastage of water.

In one aspect, the present invention is directed to a stackable pot assembly having two or more blocks mounted over each other. The first block mounted over the floor having one or more rows of twin-bases arranged lengthwise or side-by-side. The upper blocks mounted one over another, and the upper blocks mounted over the first block. The upper block comprises twin-pots and round-pots. The twin-pots and round-pots have feet configured in their bottom, wherein the twin-pot have two spaced-apart feet while the round pot has a single feet. The feet include an aperture for drainage of water and nutrition media. A lid secures the twin-bases, twin-pots, and round-pots, wherein the lid is having apertures for receiving the feet when a twin-pot or a round-pot is mounted over the lid secured to below twin-base or twin-pot. The apertures in the lid are hereinafter referred to as a seat. The lid is further having a plant hole.

These and other objects and advantages of the embodiments herein will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1A:
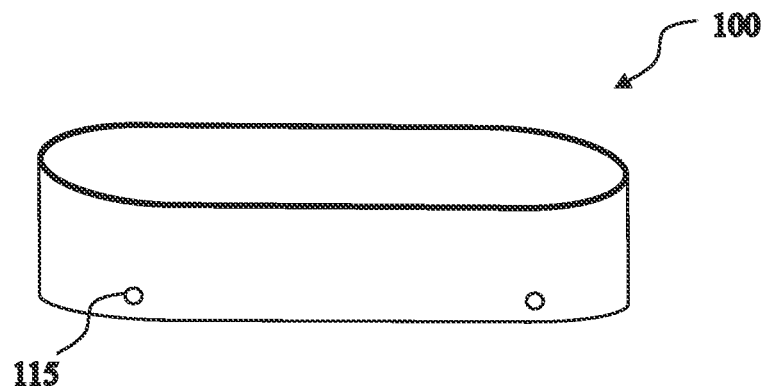
FIG. 1A is a perspective view of a twin-base, according to an embodiment of the present invention.
Figure 1B:
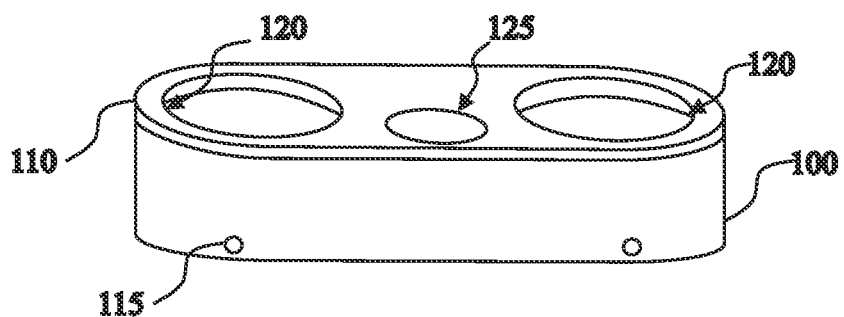
FIG. 1B shows the twin-base of FIG. 1A with the twin-lid, according to an embodiment of the present invention.

The present invention is directed to a stackable pot assembly that can be used in hydroponics and soil-based cultivation of plants. Now referring to FIGS. 1A and 1B, which show an embodiment of the twin-base 100 which is a rectangular oblong shaped container. The twin-base 100 having a bottom, a wall extending upwards from the bottom, and an open-top. FIG. 1B shows the twin-base 100 with a lid 110 covering the open-top of the twin-base 100. Twin-lid 110 can be removably coupled to the twin-base 100. The twin-base 100 can be provided with an inlet/outlet for hoses to connect with the twin-base 100 for removing a liquid contained in the twin-base 100. The inlet/outlet can be apertures through which any liquid in the twin-base 100 can be drained out. FIGS. 1A and 1B show two inlet/outlet ports 115 and two inlet/outlet ports (opposite side, not shown) configured in the wall of the twin-base 100. The twin-base 100 acts as a base over which the pots can be stacked. It can be positioned over the ground and act as a collector tray or holding tank for water or nutrition media. Also, it may be advantageous that the center of the bottom of the twin-base 100 is raised a bit on the inside to assist any standing liquid to drain towards the inlet/outlet ports.

Figure 2:
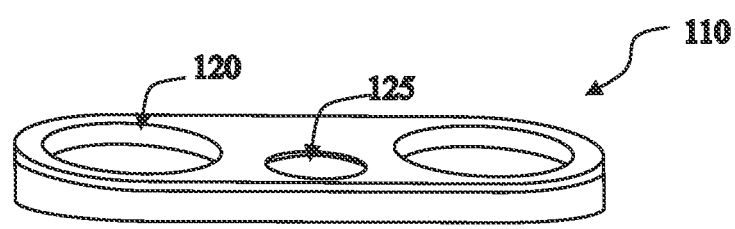
FIG. 2 is a perspective view of a twin-lid, according to an embodiment of the present invention.

An embodiment of the twin-lid 110 is shown in FIG. 2, which is shown to be of a rectangular oblong shape. The twin-lid 110 is having a surrounding lip along its perimeter and extending downwards away from the lid. The lip allows the twin-lid to be secured to the rim of the twin-base 100 or a twin-pot 200. Any possible fastening structures known in the art for coupling a lid to a container, such as snap-fit, can be configured in the twin-lid 110, without departing from the scope of the present invention. Furthermore, it can be seen in FIG. 2 is a pair of spaced-apart apertures 120. These apertures can have a skirt around their periphery that extends orthogonally downwards away from the lid. The aperture 120 can be hereinafter referred to as a seat 120. Also, is shown in FIG. 2 is an additional aperture positioned near the middle of the spaced-apart apertures 120. This aperture is referred herein as a plant hole 125, the plant hole 125 is located near the edge of the twin-lid 110. The plant hole 125 provides a passage for the plant to grow upwards. In one case, the twin-lid can be made of plastic. Moreover, the size and shape of the twin-lid 110 are commensurate with the size and shape of the twin-base 100 or a twin-pot 200 (shown in FIG. 3A). In one case, the twin-lid 110 is of a length of about 20 inches and a width of about 8 inches. The spaced-apart apertures or seats having a diameter of about 6 inches and the plant hole having a diameter of about 3 inches. In one case, the diameter of the plant hole can be of a range 2.5 to 4.5 inches. The diameter of the spaced-apart apertures can be in a range of 4-8 inches.

Figure 3A:
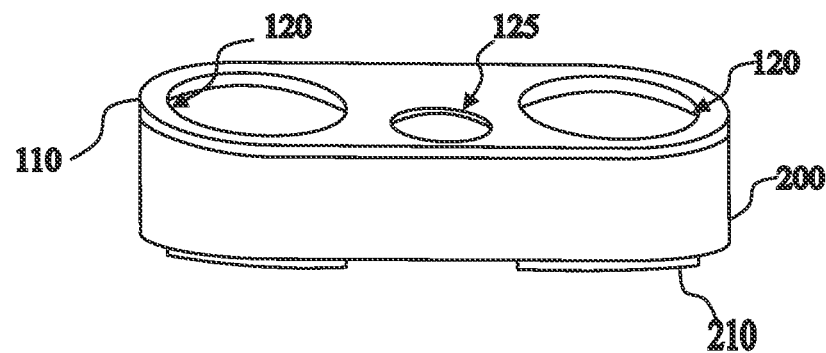
FIG. 3A is a perspective view of a twin-pot with a twin-lid, according to an embodiment of the present invention.
Figure 3B:
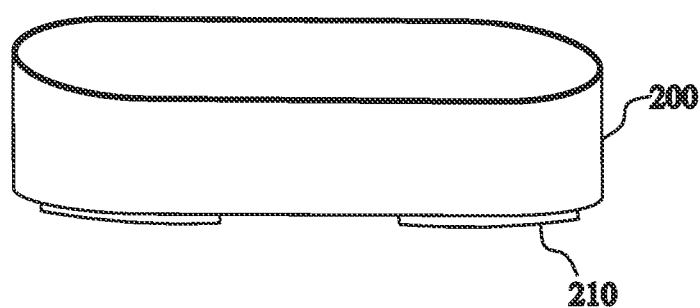
FIG. 3B shows the twin-pot of FIG. 3A without the twin-lid, according to an embodiment of the present invention.

FIGS. 3A and 3B show an embodiment of the twin-pot 200 according to the present invention. The twin-pot 200 can be shaped and sized similar to the twin-base 100 except having feet 210 instead of having the inlet/outlet 115. FIG. 3A shows the twin-pot 200 with a lid 110 and FIG. 3B shows the twin-pot 200 without lid 110. The lid 110 can be similar to the lid described above in FIG. 2. The twin-pot 200 can be of a rectangular oblong shape, having a bottom and a wall extending upward from the bottom defining volume of the twin-pot 200. The top of the twin-pot 200 is open as shown in FIG. 3B. The bottom is having a pair of spaced-apart feet 210. The feet 120 is a skirt extending downwards from the bottom of the twin-pot 200. The skirt extends orthogonally in a downward direction away from the bottom. The feet 210 are positioned and sized to be received into the seats 120 of the twin-lid 110. When the twin-pot 200 is mounted (stacked) over a twin-base 100 or another twin-pot 200, the feet 210 positions over the spaced-apart seats 120 of the twin-lid 110 covering the below twin-base 100, and the feet 210 can then fit into the seat 120. The skirt portion of feet 210 can detachably mate with the skirt portion of the seat 120 when the twin-pot 200 is mounted over the twin-lid 110. In one case, the twin-pot 200 can be made of any suitable material known for manufacturing stackable plant pots, such as plastic or ceramic. More preferably, the twin-pot 200 can be made of plastic material that is durable and can withstand weathering conditions such as sunlight and water. The wall of the twin-pot 200 shown in FIGS. 3a and 3B rise orthogonally from the bottom, however, the wall can slightly taper outwards from bottom to top. Plant pots are generally manufactured in a tapered shape, having a broad top. This enables them to stack inside each other to save space in storage and shipping.

Figure 3C:
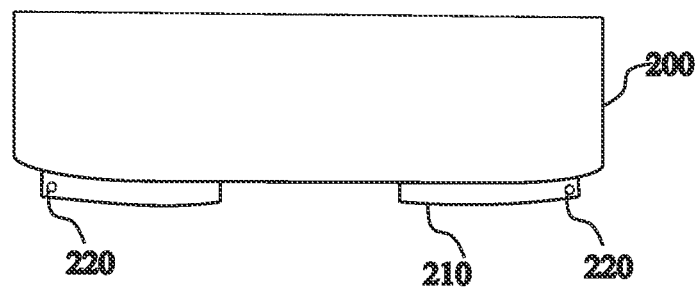
FIG. 3C is the front side of the twin-pot of FIG. 3B showing drain holes, according to an embodiment of the present invention.

FIG. 3C shows a front side of the twin-pot 200 having feet 210 configured at the bottom. Furthermore, shown in FIG. 3C are apertures 220 in fluid communication with the interior of the twin-pot 200. The apertures 220 hereinafter also referred to as drain holes. The drain hole 220 allows water or nutritional media from the twin-pot 200 to drain out. The drained liquid from a pot passes through the drain hole 220 into a lower pot or base, over which the twin-pot is mounted. Ultimately, the liquid can be collected into the twin-bases 100 over which the pots are mounted. The drain holes are preferably positioned such that the liquid including water or nutrition media flowing out of the drain hole can be directed towards the plant that is incorporated in below pot.

Figure 4A:
FIG. 4A is a perspective view of a round-lid, according to an embodiment of the present invention.
Figure 4B:
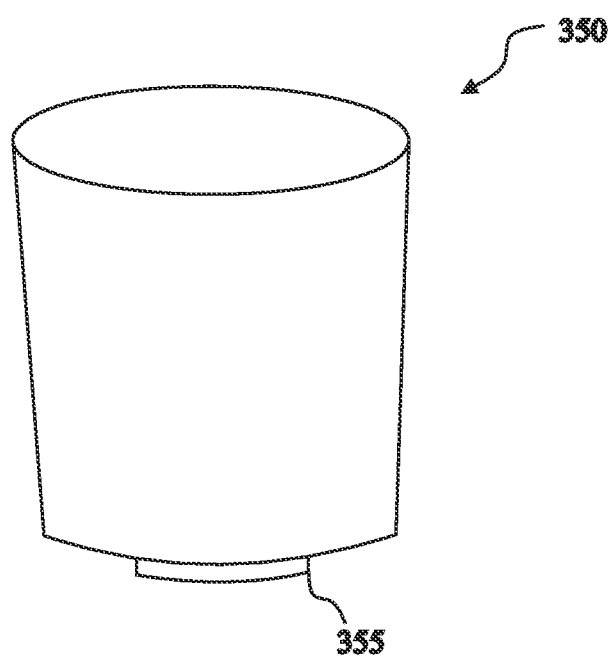
FIG. 4B is a perspective view of a round-pot, according to an embodiment of the present invention.

FIGS. 4A and 4B show an embodiment of a round-lid 300 and a round-pot 350 according to the present invention. The round-pot 350 can be similar to the twin-pot 200 but can be round in shape, smaller in size, and have a single feet 355 configured at the bottom. Like the feet 210 of the twin-pot, the feet 355 of the round-pot can also have a drain hole (not shown). The shape of the round-pot 350 can be substantially round to oval. The round-lid 300 is shaped and size to cover the open-top of the round-pot 350. The round-lid can also be similar in construction to the twin-lid 110, except only having a single aperture or seat 305.

The above-described components in FIG. 1-4 can be arranged horizontally and vertically to form a stacked pot assembly. The twin-bases 100 can be arranged lengthwise or side-by-side, or both to form horizontal arrays of the twin-bases 100. Each of the twin-base 100 is covered with the twin-lids 110. The twin-pots 200 and round-pots 300 can then be stacked over the array of twin-base 100. To mount a twin-pot 200 over a twin-base 100, the feet 210 of the twin-pot 200 can be positioned over the seat 120 of twin-lid covering the twin-base 100, and then fit into the seat 120. Similarly, a twin-pot 200 or a round-pot 350 can be mounted over another twin-pot 200 or round-pot 350. In one case, a single twin-pot 200 can be mounted over two adjacent twin-bases 100. One of the two feet 210 can be received into one of the two seats 120 of the twin-base 100, while the other feet 210 can be fitted into a seat 120 of adjacent twin-base 100. Similarly, a twin-pot can be mounted over two adjacent twin-pots. Such an arrangement of twin-pots, round-pots, and the twin-bases, allows different configuration of the stacked pot assembly.

Figure 5:
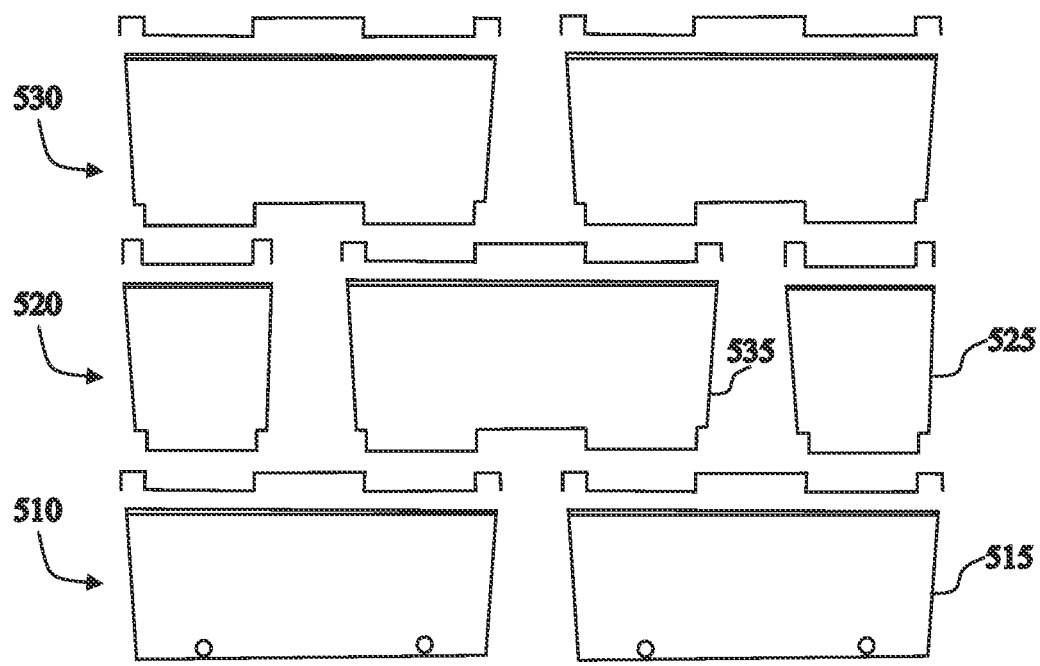
FIG. 5 shows a stacked pot assembly, according to an embodiment of the present invention.
Figure 6A:
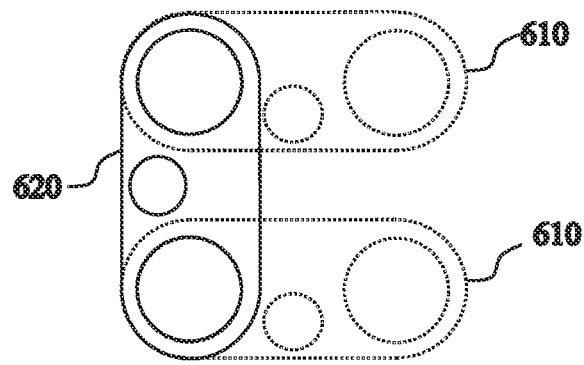
FIG. 6A shows another embodiment of the stacked pot assembly, according to the present invention.
Figure 6B:
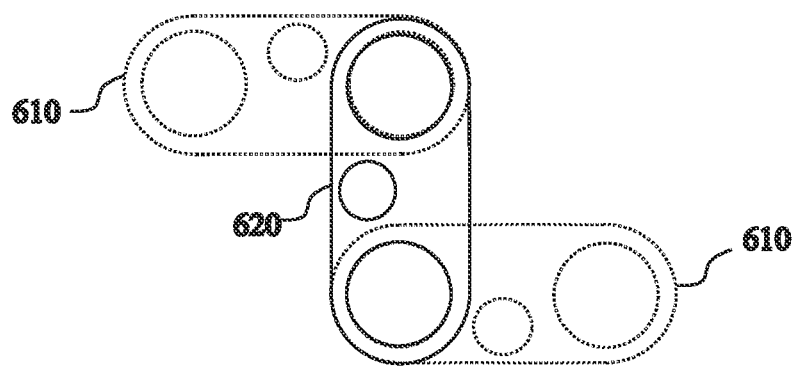
FIG. 6B shows another embodiment of the stacked pot assembly, according to the present invention.
Figure 6C:
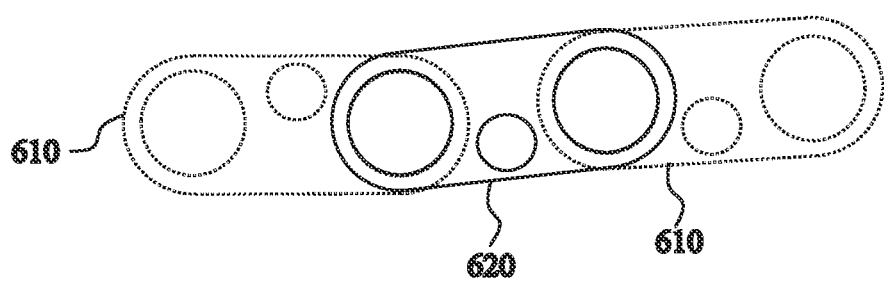
FIG. 6C shows another embodiment of the stacked pot assembly in which the first twin-base and the second twin-base are arranged lengthwise at an angle other than 180 degrees, according to the present invention.

FIG. 5 shows one embodiment of the arrangements of twin-pots, round-pots, and the twin-bases to form a stacked pot assembly. As shown in FIG. 5, the stacked pot assembly is shown to have 3 layers of blocks, wherein each block is having one or more rows of twin-bases or twin-pots. The first block 510 is having a horizontal array of twin-bases 515 arranged length to length. Each of the twin-bases 515 is covered with the twin-lids. The second block 520 is mounted over the first block 510. The second block 520, is shown to have twin-pots 535 and round-pots 525. The feet of the twin-pots 535 and round-pots 525 are shown to be aligned with the seats of the twin-lids over which the second block is stacked. The feet fit into the seats for mounting the twin-pots 535 and round-pots 525 over the twin-bases 515. Furthermore, it can be seen in the figure, the single twin-pot 535 mounted over two adjacent twin-bases 515. Round-pots 525 are at the terminals filling the vacant single seats. A third block 530 is mounted over the second block 520 resulting in the stacked pot assembly according to the present invention. The third block 530 is shown to have twin-pots 535 mounted over round-pots 525 and other twin-pot 535. It is to be understood that FIG. 5 shows one specific arrangement of twin-pots, round-pots, and the twin-bases to form a stacked pot assembly, however other arrangements and more than three layers are possible and are within the scope of the present invention. One such alternate embodiment is shown in FIG. 6A, wherein the first layer is shown in broken lines and the above layer in normal lines. The first layer can be twin-pots 610 or twin-bases 610 arranged side-by-side. Twin-pot 620 of the second layer is mounted over the twin-pots 610 in a cross-arrangement. Similarly, one more possible arrangement is shown in FIG. 6B.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A stackable pot assembly comprising:
   a twin-base of an oblong shape, the twin-base has a bottom, a wall extending upwards from the bottom defining an inner volume of the twin-base, and an open-top, the wall of the twin-base has an inlet and an outlet;
   a twin-pot of an oblong shape the twin-pot has a bottom, a wall extending upwards from the bottom defining an inner volume of the twin-pot, and an open-top, the bottom of the twin-pot configured with a pair of spaced-apart feet; and
   a twin-lid of an oblong shape and configured to cover the open-top of the twin-base, the twin-lid has a pair of spaced-apart apertures and a plant hole, the pair of spaced-apart sized to receive the pair of spaced-apart feet,
   wherein each of the pair of spaced-apart feet comprises a drain hole in fluid communication with the inner volume of the twin-base.

2. The stackable pot assembly of claim 1, wherein each aperture of the pair of spaced-apart apertures in the twin-lid has a skirt extending downwards from a periphery of each aperture, wherein the skirt is configured to snugly mate with feet of the pair of spaced-apart feet.

3. The stackable pot assembly of claim 1, wherein the plant hole of the twin lid is of a size different than that of the pair of spaced-apart apertures.

4. The stackable pot assembly of claim 1, wherein the plant hole of the twin lid is of a diameter of about 2.5-3.5 inches.

5. The stackable pot assembly of claim 4, wherein each of the pair of spaced-apart feet is of a diameter of about 5 to 7 inches.

6. The stackable pot assembly of claim 1, further comprising:
   a round-pot that has a single foot configured at its bottom, the single feet and the pair of spaced-apart feet are of same size and shape; and
   a round-lid that has an aperture, the aperture in the round-lid and the pair of spaced-apart apertures in the twin-lid are of same size and shape.

7. The stackable pot assembly of claim 6, wherein the single foot has a drain hole.

8. A stacked pot assembly comprising:
   a first twin-lid and a second twin-lid, wherein each of the first twin-lid and the second twin-lid has pair of spaced-apart apertures and a plant hole;
   a first twin-base and a second twin-base that is adjacent to the first twin-base, the first twin-base and the second twin-base are arranged lengthwise or side-by-side, each of the first twin-base and second twin-base has a bottom, a wall extending upwards from the bottom wherein the bottom and the wall define an inner volume of the each of the first twin-base and the second twin-base, and an open-top, the open-top of the first twin-base covered by the first twin-lid, the open-top of the second twin-base covered by the second twin-lid, the wall of the each of the first twin-base and the second twin-base has an inlet and an outlet; and
   a twin-pot that has a bottom, a wall extending upwards from the bottom defining an inner volume of the twin-pot, and an open-top, the open-top covered by a third twin-lid, the bottom of the twin-pot configured with a first foot and a second foot spaced-apart from each other;

wherein the twin-pot is mounted over the first twin-base and the second twin-base, such that the first foot is received into one of the pair of spaced-apart apertures of the first twin-lid secured to the first twin-base, and the second foot is received into one of the pair of spaced-apart apertures of the second twin-lid secured to the second twin-base, wherein each of the first feet and the second foot has a drain hole.

9. The stacked pot assembly of claim 8, wherein the first twin-base and the second twin-base are arranged side-by-side.

10. The stacked pot assembly of claim 8, wherein the first twin-base and the second twin-base are arranged length-wise.

11. The stacked pot assembly of claim 8, wherein the first twin-base and the second twin-base are arranged lengthwise at an angle other than 180 degrees.

12. The stacked pot assembly of claim 8, wherein the stacked pot assembly further comprises:

a round-pot having a single foot configured at a bottom of the round-pot, the single foot, the first feet, and the second feet are of same size and shape; and a round-lid having an aperture, the aperture and the pair of spaced-apart apertures are of same size and shape; and wherein the round-pot is mounted over the first twin-base, such that the single foot of the round-pot is received into an empty aperture of the pair of spaced-apart apertures of the first twin-lid.

13. The stacked pot assembly of claim 12, wherein the stacked pot assembly further comprises a second round-pot mounted over the second twin-lid secured to the second twin-base.

14. A stacked pot assembly comprising:

a first block;

a second block mounted over the first block;

a third block mounted over the second block;

the first block comprises one or more rows of a plurality of twin-bases, each of the plurality of twin-bases is of an oblong shape and has a bottom, a wall extending upwards from the bottom defining an inner volume of the each of the plurality of twin-bases, and an open-top, the wall of the each of the plurality of twin-bases has an inlet and an outlet, the plurality of twin-bases are arranged length-wise or side-by-side, the open-top of the plurality of twin-bases covered by a plurality of first twin-lids, each of the plurality of first twin-lids has a pair of spaced-apart apertures and a plant hole, and each of the second block and the third block comprises a plurality of twin-pots, each of the plurality of twin-pots is of an oblong shape, and has a bottom, a wall extending upwards from the bottom defining an inner volume of the each of the plurality of twin-pots, and an open-top, the bottom of the each of the plurality of twin-pots configured with a pair of spaced-apart feet, the open-top of the plurality of twin-pots covered by a plurality of second twin-lids, each of the plurality of second twin-lids has a pair of spaced-apart apertures and a plant hole, wherein each foot of the pair of spaced-apart feet is configured to fit within each aperture of the pair of spaced-apart apertures of the plurality of first twin-lids and the plurality of second twin-lids, wherein each foot of the pair of spaced-apart feet has a drain hole.

15. The stacked pot assembly of claim 14, wherein each of the plurality of twin-pots of the second block is mounted over a pair of adjacent twin-bases of the plurality of twin-bases of the first block.

16. The stacked pot assembly of claim 15, wherein each of the plurality of twin-pots of the third block is mounted over a pair of adjacent twin-pots of the plurality of twin-pots of the second block.

17. The stacked pot assembly of claim 16, wherein each of the second block and the third block further comprises:

a round-pot that has a single foot configured at a bottom of the round-pot, the single foot and the pair of spaced-apart feet are of same size and shape; and a round-lid that has an aperture, the aperture and the pair of spaced-apart apertures of the plurality of first twin-lids and the plurality of second twin-lids are of same size and shape.

18. The stacked pot assembly of claim 14, wherein a size of each aperture of the pair of spaced-apart apertures of the plurality of first twin-lids and the plurality of second twin-lids is different than a size of each plant hole of the plurality of first twin-lids and the plurality of second twin-lids.

* * * * *